United States Patent
Kang et al.

(10) Patent No.: US 9,432,138 B2
(45) Date of Patent: Aug. 30, 2016

(54) METHOD AND APPARATUS FOR SEARCHING CONTROL INFORMATION BY TERMINAL IN MULTI-NODE SYSTEM

(75) Inventors: Ji Won Kang, Anyang-si (KR); Bin Chul Ihm, Anyang-si (KR); Su Nam Kim, Anyang-si (KR); Jin Young Chun, Anyang-si (KR); Sung Ho Park, Anyang-si (KR); Ki Tae Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 209 days.

(21) Appl. No.: 14/002,322

(22) PCT Filed: Dec. 19, 2011

(86) PCT No.: PCT/KR2011/009812
§ 371 (c)(1),
(2), (4) Date: Sep. 20, 2013

(87) PCT Pub. No.: WO2012/118270
PCT Pub. Date: Sep. 7, 2012

(65) Prior Publication Data
US 2014/0003379 A1    Jan. 2, 2014

Related U.S. Application Data

(60) Provisional application No. 61/448,146, filed on Mar. 1, 2011, provisional application No. 61/475,201, filed on Apr. 13, 2011.

(51) Int. Cl.
*H04J 11/00* (2006.01)
*H04L 5/00* (2006.01)
(Continued)

(52) U.S. Cl.
CPC .......... *H04J 11/0083* (2013.01); *H04L 1/0046* (2013.01); *H04L 5/0053* (2013.01); *H04L 5/0091* (2013.01); *H04W 72/042* (2013.01)

(58) Field of Classification Search
CPC  H04J 11/0083; H04L 5/0091; H04L 1/0046; H04L 5/0053; H04W 72/042
See application file for complete search history.

(56) References Cited

U.S. PATENT DOCUMENTS

2010/0087202 A1    4/2010 Ventola et al.
2010/0165847 A1    7/2010 Kamuf et al.
(Continued)

FOREIGN PATENT DOCUMENTS

WO    WO 2011/085192 A1    7/2011

OTHER PUBLICATIONS

Nortel Networks, "Control Channel Design for the Support of Wider Bandwidth for LTE-Advanced," TSG-RAN1 #55bis, R1-090157, Ljubljana, Slovenia, Jan. 12-16, 2009, pp. 1-10.
(Continued)

*Primary Examiner* — Jackie Zuniga Abad
(74) *Attorney, Agent, or Firm* — Birch, Stewart, Kolasch & Birch, LLP

(57) ABSTRACT

Provided are a method and an apparatus for searching control information by a terminal. The method comprises the steps of: acquiring from a base station, by means of a physical downlink control channel (PDCCH) or an upper layer message, at least one type of information being from location information on a physical control format indication channel (E-PCFICH) or location information on an E-control region; receiving the E-PCFICH based on the E-PCFICH location information; acquiring size information on the E-control region by means of the E-PCFICH; and searching E-PDCCH in the E-control region.

6 Claims, 13 Drawing Sheets

(51) Int. Cl.
*H04W 72/04* (2009.01)
*H04L 1/00* (2006.01)

(56) References Cited

U.S. PATENT DOCUMENTS

2011/0044391 A1 2/2011 Ji et al.
2011/0170496 A1* 7/2011 Fong et al. ............ 370/329
2012/0044821 A1* 2/2012 Kim ..................... H04L 5/001
                                                    370/252

OTHER PUBLICATIONS

Samsung, "PDCCH Extension for ICIC and Capacity Gains," 3GPP TSG RAN WG1 #60bis, R1-102224, Beijing, China, Apr. 12-16, 2010, pp. 1-2.

* cited by examiner

METHOD AND APPARATUS FOR SEARCHING CONTROL INFORMATION BY TERMINAL IN MULTI-NODE SYSTEM

CROSS-REFERENCE TO RELATED APPLICATIONS

This application is the National Phase of PCT/KR2011/009812 filed on Dec. 19, 2011, which claims the benefit under 32 U.S.C. §119 (e) to U.S. Provisional applications 61/448,146 filed on Mar. 1, 2011, and 61/475,201 filed on Apr. 13, 2011, all of which are incorporated by reference in their entirety herein.

BACKGROUND OF THE INVENTION

1. Field of the Invention

The present invention relates to a wireless communication, and more particularly, to a method and an apparatus for searching control information by a terminal in a multi-node system.

2. Discussion of the Related Art

In recent years, data traffic of a wireless communication network has rapidly increased. The reason is advent and propagation of various devices such as a smart phone, a tablet PC, and the like requiring machine-to-machine (M2M) communication and high data traffic. Multi-antenna technology, multi-station cooperative transmission technology, and the like have recently stood out in order to increase a data capacity within a limited frequency, such as carrier aggregation (CA) technology, cognitive radio (CR) technology, and the like which efficiently use more frequency bands.

Further, the wireless communication network has advanced so that the density of accessible nodes becomes higher around a user. Herein, the nodes may mean antennas or antenna groups which are spaced by a predetermined interval in a distributed antenna system (DAS), but are not limited to the meaning and may be used a wider meaning. That is, the nodes may be a macro base station, a pico cell base station (PeNB), a home base station (HeNB), a remote radio head (RRH), a remote radio unit (RRU), a relay, a distributed antenna (group), and the like. The wireless communication system having the nodes of high density may show higher system performance by cooperation between the nodes. That is, rather than a case in which the respective nodes operate without cooperation with each other as independent base stations, when each node of which transmission and reception are managed by one control station operates like an antenna or an antenna group for one cell, transmission and reception of each node are managed by one control station, the wireless communication system can show more excellent system performance. Hereinafter, a wireless communication system including a plurality of nodes and a base station controlling the plurality of nodes is referred to as a multi-node system.

SUMMARY OF THE INVENTION

An object of the present invention is to provide a method and an apparatus for searching control information by a terminal in multi-node system.

In accordance with an aspect of the present invention, there is provided a method for searching control information by a terminal, including the steps of: acquiring from a base station, by means of a physical downlink control channel (PDCCH) or a higher layer message, at least one type of information being from location information of a physical control formation indication channel (E-PCFICH) or location information of an E-control region; receiving the E-PCFICH based on the location information of the E-PCFICH; acquiring size information of the E-control region by means of the E-PCFICH; and searching the E-PDCCH in the E-control region, and the PDCCH is a control channel through which the base station transports control information and is transported in first N (N is one of natural numbers of 1 to 4) orthogonal frequency division multiplexing (OFDM) symbols, the E-PDCCH is a control channel through which the base station transports control information and is positioned in at least one OFDM symbol positioned subsequent to the PDCCH, and the E-control region is a radio resource region including at least one of the E-PDCCH and the E-PCFICH, and is determined based on the location information of the E-control region and the size information of the E-control region.

An E-PCFICH region in which the E-PCFICH is transported and an E-PDCCH region in which the E-PDCCH is transported may be positioned at the same resource block.

The E-PCFICH may be positioned outside the E-control region and transported in a resource region which a first OFDM symbol of the subframe to which the PCFIC to the size information of the PDCCH is allocated.

The size information of the E-control region may include at least one of size information of the E-control region in terms of a time and size information of the E-control region.

As the size information of the E-control region in terms of the time, the number of OFDM symbols or the number of slots may be given and as the size information of the E-control region in terms of the frequency, the number of resource blocks or the number of subcarriers may be given.

The location information of the E-control region and the size information of the E-control region are joined to each other to configure one information, which is encoded.

At least one of the location information of the E-PCFICH and the location information of the E-control region may be included in downlink control information (DCI) transported through the PDCCH or a higher layer message.

At least one of the location information of the E-PCFICH and the location information of the E-control region may be associated with node information received from the base station, and the node information may include at least one of a node index, a reference signal port number, a reference signal configuration number, and a reference signal subframe configuration number.

In accordance with another aspect of the present invention, there is provided a method for searching control information by a terminal, including the steps of: acquiring location information of an E-control region from a base station through a higher layer message; receiving an E-PCFICH at a predetermined resource location; acquiring size information of the E-control region by means of the E-PCFICH; and acquiring size information of the E-control region by means of the E-PCFICH; and the E-control region may be a radio resource region including at least one of the E-PDCCH and the E-PCFICH, and be determined based on the location information of the E-control region and the size information of the E-control region.

The higher layer message may be a radio resource control (RRC) message.

The RRC message may be included in a master information block (MIB) included in a physical broadcast channel (PBCH) through which the base station broadcasts information to be transported.

The RRC message is included in a physical downlink shared channel (PDSCH) through which the base station transports information to a specific terminal to be transported.

In accordance with yet another aspect of the present invention, there is provided a method for searching control information by a terminal, including the steps of: receiving a control format index (CFI) from a base station through a physical control format indication channel (PCFICH); acquiring configuration information of an E-control region based on the control format index; and searching an E-PDCCH in the E-control region determined based on the configuration information of the E-control region, and the PCFICH is a channel to transport size information of a physical downlink control channel (PDCCH) through which the base station transports control information and the control format index is a reserved index among indexes designated as size information of a physical downlink control channel (PDCCH).

A value of the control format index may be 4.

In accordance with yet another aspect of the present invention, there is provided a terminal, including: an RF unit transporting and receiving a radio signal; and a processor connected to the RF unit, and the processor acquirers from a base station, by means of a physical downlink control channel (PDCCH) or a higher layer message, location information of a physical control formation indication channel (E-PCFICH) and location information of an E-control region, receives the E-PCFICH based on the location information of the E-PCFICH, acquires size information of the E-control region by means of the E-PCFICH, and searches the E-PDCCH in the E-control region, the PDCCH is a control channel through which the base station transports control information and is transported in first N (N is one of natural numbers of 1 to 4) orthogonal frequency division multiplexing (OFDM) symbols, and The E-control region for the at least one node is a radio resource region in which the at least one node transports control information and is determined based on the location information of the E-control region and the size information of the E-control region.

In accordance with yet another aspect of the present invention, there is provided a terminal, including: an RF unit transporting and receiving a radio signal; and a processor connected to the RF unit, and the processor acquires location information of an E-control region for at least one node among a plurality of nodes from a base station through a higher layer message, receives an E-PCFICH at a predetermined resource location for the at least one node, acquires size information of the E-control region for the at least one node by means of the E-PCFICH, and searches the E-PDCCH for at least one node in the E-control region, and the E-control region for the at least one node is a radio resource region in which the at least one node transports control information and is determined based on the location information of the E-control region and the size information of the E-control region.

In accordance with yet another aspect of the present invention, there is provided a terminal, including: an RF unit transporting and receiving a radio signal; and a processor connected to the RF unit, and the processor receives a control format index (CFI) from a base station through a physical control format indication channel (PCFICH), acquires configuration information of an E-control region for the at least one node of a plurality of nodes based on the control format index, and searches an E-PDCCH in the E-control region for the at least one node determined based on the configuration information of the E-control region, and the PCFICH is a channel to transport size information of a physical downlink control channel (PDCCH) through which the base station transports control information and the control format index is a reserved index among indexes designated as size information of a physical downlink control channel (PDCCH).

According to the present invention, a multi-node system supports a resource region where a node transports control information to a terminal and supports a new channel that transports size information of the resource region. It is impossible to efficiently transport the control information even under a situation in which the number of terminals varies.

DETAILED DESCRIPTION OF THE INVENTION

The technology may be applied to various wireless communication systems such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a radio technology such as universal terrestrial radio access (UTRA) or CDMA2000. The TDMA may be implemented by a radio technology such as global system for mobile communications (GSM)/general packet radio service (GPRS)/enhanced data rates for GSM evolution (EDGE). The OFDMA may be implemented by a radio technology such as IEEE 802.11 (Wi-Fi), IEEE 802.16 (WiMAX), IEEE 802-20, or E-UTRA (Evolved UTRA). The IEEE 802.16m as an evolution of IEEE 802.16e provides backward compatibility to a system based on the IEEE 802.16e. The UTRA is a part of a universal mobile telecommunication system (UMTS). $3^{rd}$ generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

A situation in which the present invention is applied to the LTE-A system for clear description, but the spirit of the present invention is not limited thereto.

Figure 1:
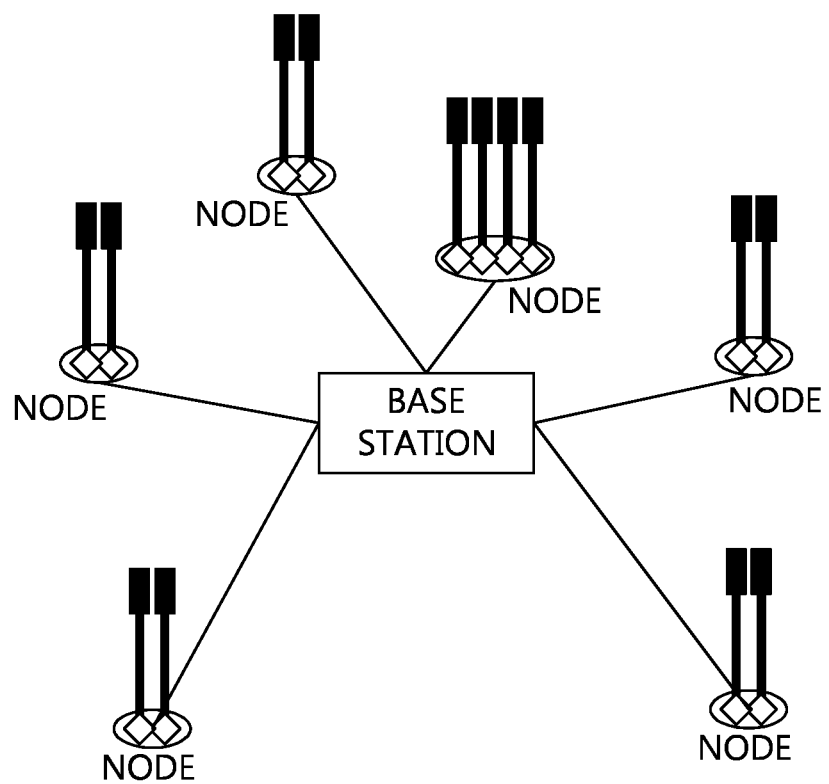
FIG. 1 illustrates one example of a multi-node system.

FIG. 1 illustrates one example of a multi-node system.

The multi-node system includes a base station (BS) and a plurality of nodes.

The base station provides a communication service to a specific geographical region. The base station generally represents a fixed station that communicates with a terminal, and may be called different terms such as an evolved-NodeB (eNB), a base transceiver system (BTS), an advanced base station (ABS), and the like.

In FIG. 1, one example of a node represents a distributed antenna and in this meaning, the node may be called an antenna node (AN). However, the node is not limited to the distributed antenna and may be implemented by for example, a macro base station, a pico cell base station (PeNB), a home base station (HeNB), a remote radio head (RRH), a relay, and the like. The node may be called a point. The node is connected with the base station by a wired or wireless method to be controlled/managed by the base station.

The node may be identified or indicated through a reference signal (RS) or a pilot signal in terms of the terminal. The reference signal (alternatively, the pilot signal, hereinafter, it is the same) means signals used for channel measurement, data demodulation, and the like as signals which a transmission point and a reception point know. The reference signal includes, for example, a channel status indication-reference signal (CRI-RS) defined in 3GPP LTE-A, and a preamble and a midamble defined in IEEE 802.16, and the like. The reference signal or a configuration for the reference signal may be mapped to each node (alternatively, a transmission antenna of each node). When mapping information between the reference signal configuration and the node is given to the terminal or the terminal knows the mapping information in advance, the terminal may identify or be indicated with the node based on the CSI-RS configuration and acquire channel status information for the corresponding node. The reference signal configuration may include information on a configuration index, the number of antenna ports of each node, a used resource element (RE), an offset of a transmission period and a transmission time, and the like. Therefore, in the specification, a technology in which the terminal measures a signal or generates channel status information with respect to a specific node for easy description may mean measuring a signal for a specific reference signal or generating the channel status information in terms of the terminal.

Referring back to FIG. 1, the node is connected with the base station by the wired/wireless method, and each node may be constituted by one antenna or a plurality of antennas (that is, an antenna group). Antennas that belong to one node are geographically positioned within several meters to show the same characteristic. In the multi-node system, the node serves as an access point (AP) which the terminal is capable of accessing.

When the node is constituted by the antenna as described above, the multi-node system may be called a distributed antenna system (DAS). That is, the distributed antenna system means a system in which the antenna (that is, node) is distributed and disposed at various locations geographically and the base station manages the antennas. The distributed antenna system is different from a conventional centralized antenna system (CAS) in that the antennas of the base station are concentrated and disposed at the center of a cell.

Herein, a meaning that the antennas are geographically distributed and disposed may be a meaning that a difference in a channel status between each antenna and the receiver is equal to or more than a specific value when one receiver receives the same signal from the plurality of antennas. A meaning that the antennas are concentrated and disposed may be a meaning that the antennas are concentrated and disposed so that the difference in the channel status between each antenna and one receiver is less than a specific value. The specific value may be variously determined depending on frequencies used for the antennas, a service type, and the like.

In general, a downlink means communication from the base station or the node to the terminal and an uplink means communication from the terminal to the base station or the node.

Figure 2:
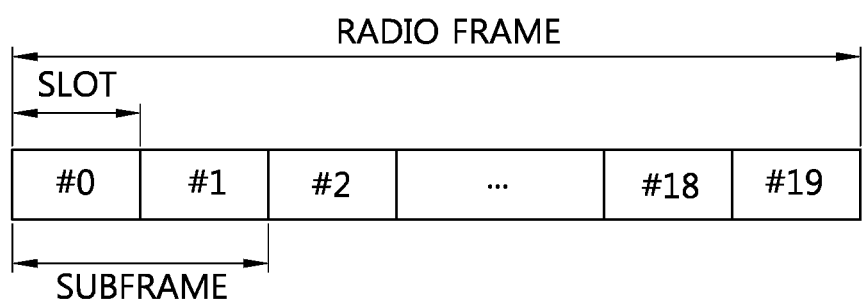
FIG. 2 illustrates a structure of a radio frame in 3GPP LTE.

FIG. 2 illustrates a structure of a radio frame in 3GPP LTE.

Referring to FIG. 2, the radio frame is constituted by 10 subframes and one subframe is constituted by 2 slots. Slot numbers of #0 to #19 are allocated to the slots in the radio frame. A time required to transport one subframe is referred to as a transmission time interval (TTI). The TTI may be a scheduling unit for data transmission. For example, the length of one radio frame may be 10 ms, the length of one subframe may be 1 ms, and the length of one slot may be 0.5 ms.

The structure of the radio frame is just one example. Therefore, the number of subframes included in the radio frame or the number of slots included in the subframe may be variously changed.

Figure 3:
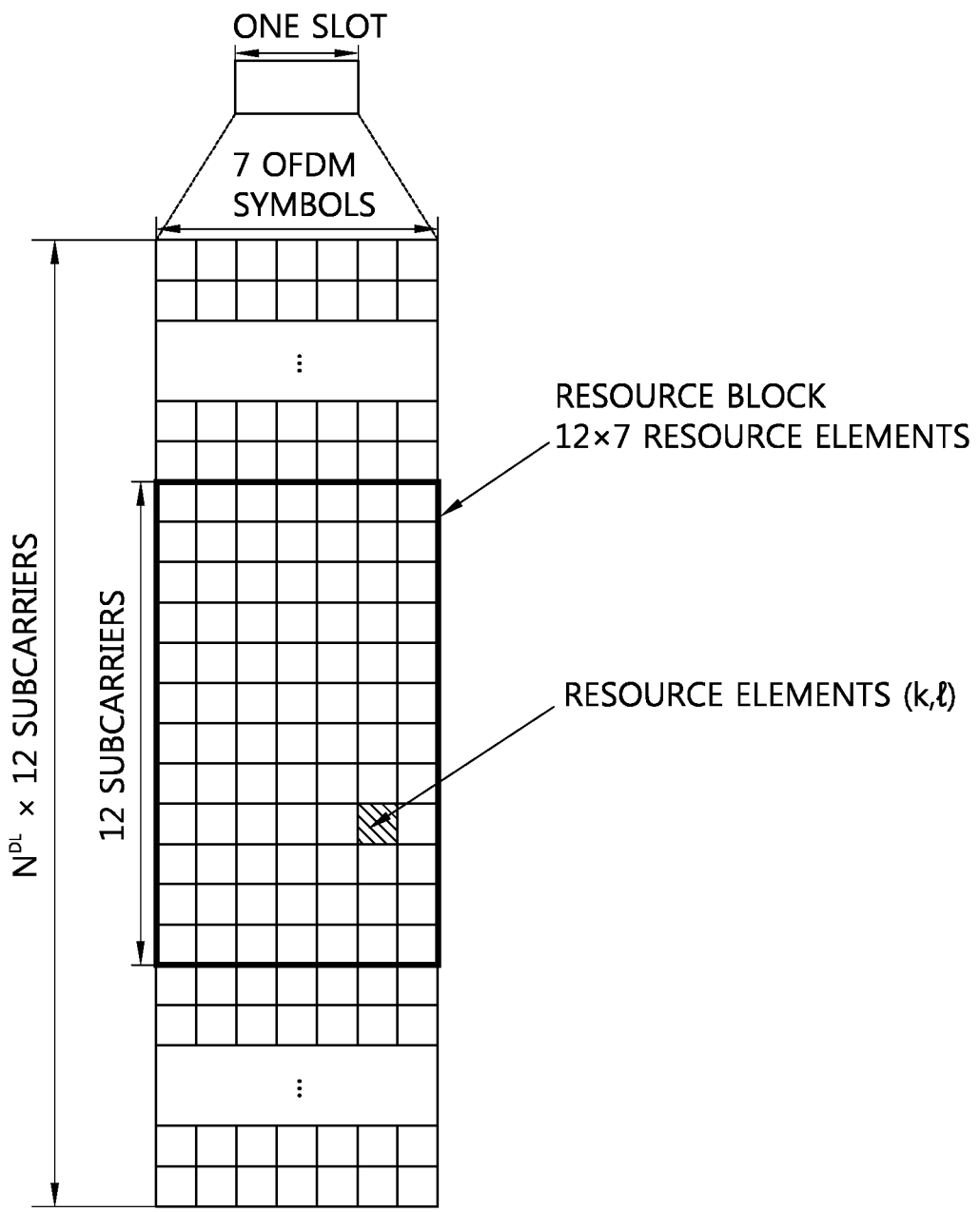
FIG. 3 illustrates one example of a resource grid for one slot.

FIG. 3 illustrates one example of a resource grid for one slot.

The slots include a downlink slot and an uplink slot. The downlink slot includes a plurality of OFDM symbols in a time region and includes $N_{RB}$ resource blocks in a frequency region. The OFDM symbol may be called an SC-FDMA symbol depending on a transmission method. The resource block includes one slot in the time region as a resource allocation unit and a plurality of consecutive subcarriers in a frequency region.

$N_{RB}$, the number of resource blocks included in the downlink slot is subordinate to a downlink transmission bandwidth configured in the cell. For example, $N_{RB}$ in the LTE system may be any one of 6 to 110. The structure of the uplink slot may be the same as that of the downlink slot.

Each element on the resource grid is referred to as a resource element (RE). The resource element on the resource grid may be identified by an index pair k and l in the slot. Herein, k (k=0, . . . , $N_{RB}$×12-1) is a subcarrier index within the frequency region and l (l=0, . . . , 6) is an OFDM symbol index within the time region.

It is exemplarily described that one resource block is constituted by 7 OFDM symbols in the time region and 12 subcarriers in the frequency region to include 7×12 resource elements, but the number of OFDM symbols and the number of subcarriers in the resource block are not limited thereto. The number Of OFDM symbols and the number of subcarriers may be variously changed depending on the length of a CP, frequency spacing, and the like. For example, in the case of a normal CP, the number of OFDM symbols is 7 and in the case of an extended CP, the number of OFDM symbols is 6. The number of subcarriers in one OFDM symbol may be used by selecting one of 128, 256, 512, 1024, 1536, and 2048.

Figure 4:
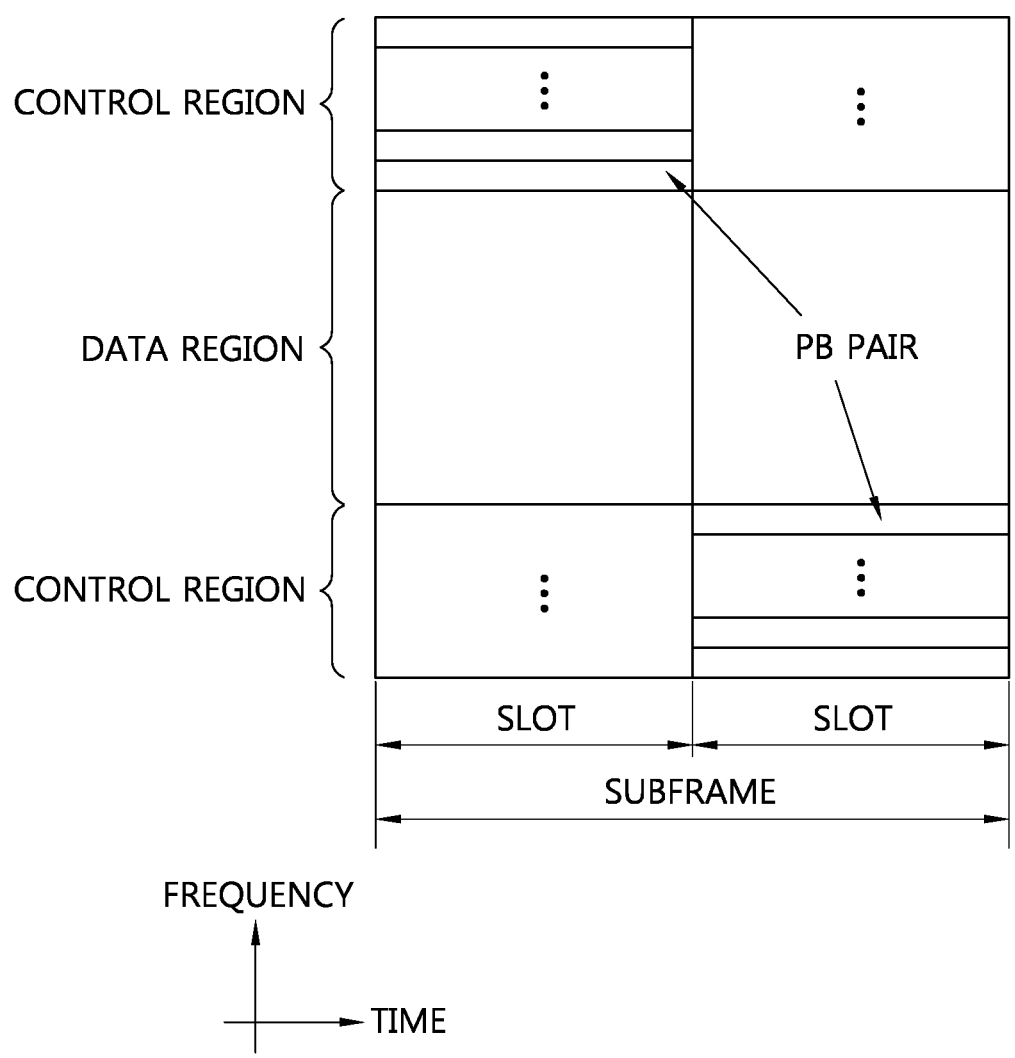
FIG. 4 illustrates a structure of an uplink subframe.

FIG. 4 illustrates a structure of an uplink subframe.

The uplink subframe may be divided into a control region and a data region in the frequency region. A physical uplink control channel (PUCCH) for uplink control information is allocated to the control region. A physical uplink shared channel (PUSCH) for transporting data is allocated to the data region. The terminal may not transport both the PUCCH and the PUSCH or transport both the PUCCH and the PUSCH.

A resource block (RB) pair is allocated to the PUCCH for one terminal in the subframe. Resource blocks that belong to the resource block pair occupy different subcarriers in a first slot and a second slot, respectively. A frequency occupied by the resource block that belong to the resource block pair allocated to the PUCCH is changed based on a slot boundary. In this case, the RB pair allocated to the PUCCH is frequency-hopped in the slot boundary. The terminal transports the uplink control information through different subcarriers depending on the time to acquire a frequency diversity gain.

The uplink control information transported on the PUCCH includes a hybrid automatic repeat request (HARQ), an acknowledgement (ACK)/non-acknowledgement (NACK), channel state information (CSI) indicating a downlink channel state, a scheduling request (SR) which is an uplink radio resource allocation request, and the like. The CSI includes a precoding matrix index (PMI) indicating a precoding matrix, a rank indicator (RI) indicating a rank value which the terminal prefers, a channel quality indicator (CQI) indicating a channel state, and the like.

The PUSCH is mapped to an uplink shared channel (UL-SCH) which is a transport channel. Uplink data transported onto the PUSCH may be a transport block which is a data block for the UL-SCH transported during the TTI. The transport block may be user information. Alternatively, the uplink data may be multiplexed data. The multiplexed data may be acquired by multiplexing the transport block for the UL-SCH and the control information. For example, the control information multiplexed to the data may include the CQI, the PMI, the HARQ, the ACK/NACK, the RI, and the like. Alternatively, the uplink data may be configured by only the control information.

Figure 5:
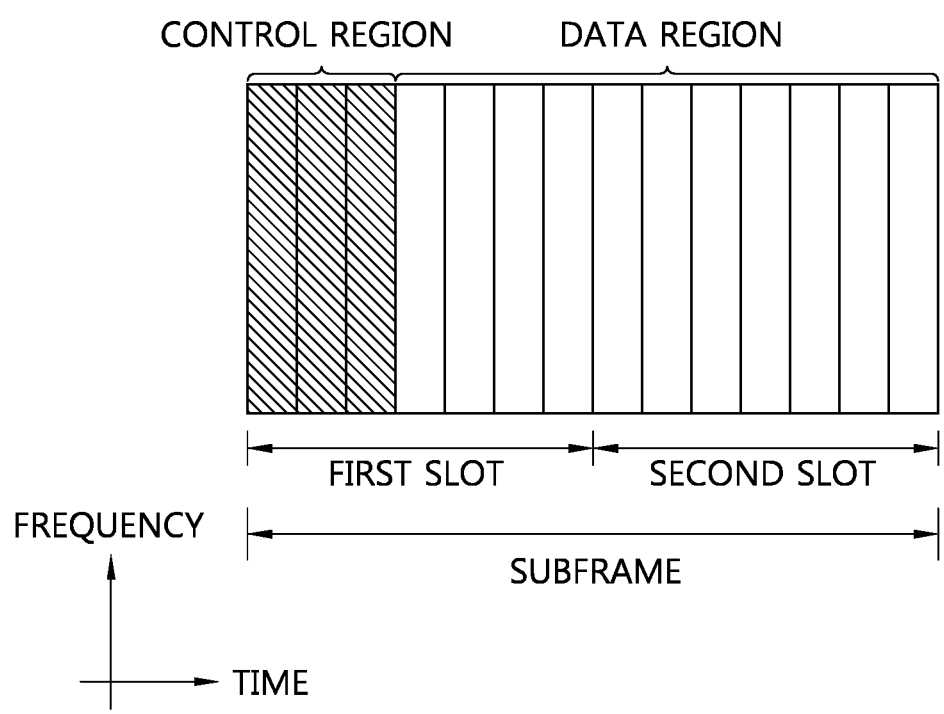
FIG. 5 illustrates a structure of a downlink subframe.

FIG. 5 illustrates a structure of a downlink subframe.

The downlink subframe includes two slots in the time region and each slot includes 7 OFDM symbols in the normal CP. Maximum 3 OFDM symbols (maximum 4 OFDM symbols for a bandwidth of 1.4 Mhz) prior to a first slot in the subframe are control regions to which control channels are allocated and remaining OFDM symbols become data regions to which a physical downlink shared channel (PDSCH) is allocated. The PDSCH represents a channel through which the base station or the node transports data to the terminal.

The control channel transported in the control region includes a physical control format indicator channel (PCFICH), a physical hybrid-ARQ indictor channel (PHICH), and a physical downlink control channel (PDCCH).

The PCFICH transported in the first OFDM symbol of the subframe transports a control format indicator (CFI) which is information on the number (that is, the size of the control region) of OFDM symbols used to transport the control channels in the subframe. The terminal first receives the CIF on the PCFICH and thereafter, monitors the PDCCH. Unlike the PDCCH, the PCFICH does not use blind decoding and is transported through the fixed PCFICH resource of the subframe.

The PHICH transports an ACK (positive-acknowledgement)/NACK (negative-acknowledgement) signal for the hybrid automatic repeat (HARQ) signal. An ACK/NACK signal for uplink (UL) data on the PUSCH transported by the terminal is transported on the PHICH.

The control information transported through the PDCCH is referred to as downlink control information (DCI). The DCI may include resource allocation (may be referred to as downlink (DL) grant) of the PDSCH, resource allocation (may be referred to as uplink (UL) grant) of the PUSCH, aggregation of transport power control commands for individual UEs within a predetermined UE group, and/or activation of voice over Internet protocol (VoIP).

Figure 6:
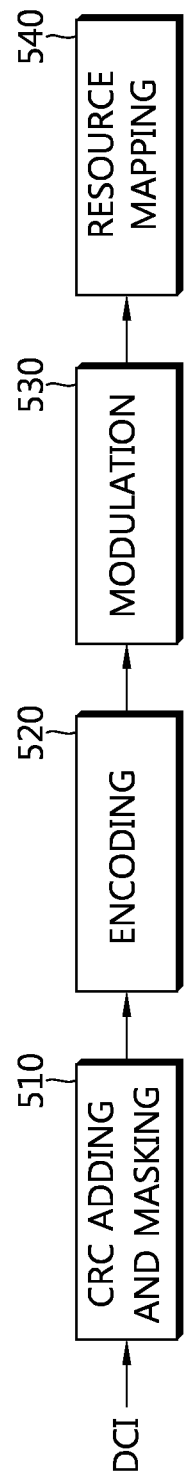
FIG. 6 is a block diagram illustrating a generation process of a PDCCH.

FIG. 6 is a block diagram illustrating a generation process of a PDCCH.

The base station attaches a cyclic redundancy check (CRC) to the DCI after determining a PDCCH format depending on the DCI to be transported and masks a unique identifier (referred to as a radio network temporary identifier (RNTI)) depending on an owner or a purpose of the PDCCH.

The following table shows a type of the RNTI.

TABLE 1

| RNTI | Use | Transport Channel | Logical Channel |
|---|---|---|---|
| P-RNTI | Paging and System Information change notification | PCH | PCCH |
| SI-RNTI | Broadcast of System Information | DL-SCH | BCCH |
| M-RNTI | MCCH Information change notification | N/A | N/A |
| RA-RNTI | Random Access Response | DL-SCH | N/A |
| Temporary C-RNTI | Contention Resolution (when no valid C-RNTI is available) | DL-SCH | CCCH |
| Temporary C-RNTI | Msg3 transmission | UL-SCH | CCCH, DCCH, DTCH |
| C-RNTI | Dynamically scheduled unicast transmission | UL-SCH | DCCH, DTCH |
| C-RNTI | Dynamically scheduled unicast transmission | DL-SCH | CCCH, DCCH, DTCH |
| C-RNTI | Triggering of PDCCH ordered random access | N/A | N/A |
| Semi-Persistent Scheduling C-RNTI | Semi-Persistently scheduled unicast transmission (activation, reactivation and retransmission) | DL-SCH, UL-SCH | DCCH, DTCH |
| Semi-Persistent Scheduling C-RNTI | Semi-Persistently scheduled unicast transmission (deactivation) | N/A | N/A |
| TPC-PUCCH-RNTI | Physical layer Uplink power control | N/A | N/A |
| TPC-PUSCH-RNTI | Physical layer Uplink power control | N/A | N/A |

Table 2 below shows a range of values of the RNTI.

TABLE 2

| Value (hexadecimal) | RNTI |
|---|---|
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI (see note) |
| 003D-FFF3 | C-RNTI, Semi-Persistent Scheduling C-RNTI, Temporary C-RNTI, TPC-PUCCH-RNTI and |

TABLE 2-continued

| Value (hexadecimal) | RNTI |
|---|---|
|  | TPC-PUSCH-RNTI |
| FFF4-FFFC | Reserved for future use |
| FFFD | M-RNTI |
| FFFE | P-RNTI |
| FFFF | SI-RNTI |

In the case of a PDCCH for a specific UE, a unique identifier, for example, a C-RNTI (cell-RNTI) may be masked to the CRC. Alternatively, in the case of a PDCCH for a paging message, a page indication identifier, for example, a P-RNTI (paging-RNTI) may be masked to the CRC. In the case of a PDCCH for system information, a system information indicator, for example, an SI-RNTI (system information-RNTI) may be masked to the CRC. A random access-RNTI (RA-RNTI) of the UE may be masked to the CRC in order to indicate a random access response which is a response to transportation of a random access preamble of the UE.

When the C-RNTI is used, the PDCCH transports control information (referred to as UE-specific control information) for a specific UE and when a different RNTI is used, the PDCCH transports common control information which all or a plurality of UEs in the cell receive.

Coded data is generated by encoding the DCI added with the CRC (520). Encoding includes channel encoding and rate matching.

The coded data is modulated, and as a result, modulation symbols are generated (530).

The modulation symbols are mapped to a physical resource element (RE) (540). The respective modulation symbols are mapped to the RE.

Figure 7:
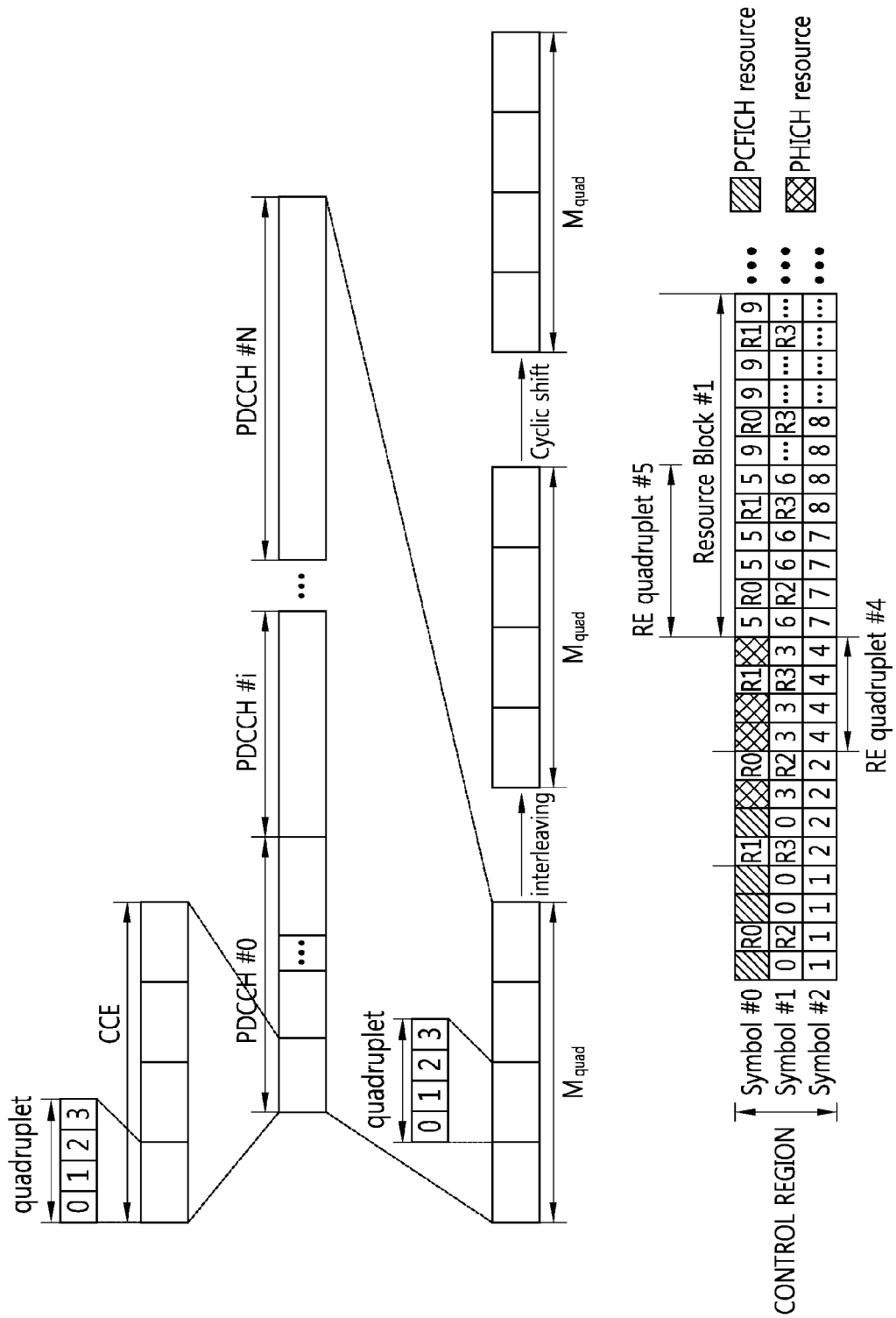
FIG. 7 illustrates an example of resource mapping of the PDCCH.

FIG. 7 illustrates an example of resource mapping of the PDCCH.

In FIG. 7, R0 represents a reference signal of a first antenna port, R1 represents a reference signal of a second antenna part, R2 represents a reference signal of a third antenna port, and R3 represents a reference signal of a fourth antenna port.

The control region in the subframe includes a plurality of control channel elements (CCEs). The CCEs correspond to a plurality of resource element groups (REGs) as a logical allocation unit used to provide coding rate depending on a state of a radio channel to the PDCCH. A format of the PDCCH and available bit rate of the PDCCH are determined according to an associative relationship between the number of CCEs and the coding rate provided by the CCEs.

One REG (displayed as a quadruplet in the figure) includes 4 Res and one CCE includes 9 REGs. 1, 2, 4, and 8 CCEs may be used in order to configure one PDCCH and respective 1, 2, 4, and 8 elements are referred to as a CCE aggregation level.

That is, the PDCCH is constituted by one or more CCEs, which are subjected to REG-unit interleaving and a cyclic shift based on a cell identifier (ID), and thereafter, mapped to a physical resource.

A plurality of PDCCHs may be transported within one subframe. The UE monitors the plurality of PDCCHs every subframe. Herein, the monitoring represents that the UE attempts to decode or detect the PDCCH depending on the PDCCH format.

The 3GPP LTE uses blind decoding in order to detect the PDCCH. The blind decoding may be called blind detection. The blind decoding is a method in which a CRC error is checked by demasking a desired identifier to a CRC of a received PDCCH (referred to as a candidate PDCCH) to verify whether the PDCCH is its own control channel. Since the UE does not know at what location and by using what CCE aggregation level or DCI format its own PDCCH is transported, the UE performs the blind decoding.

In the 3GPP LTE, a search space (SS) is used in order to reduce a burden by the blind decoding. The search space may be a monitoring set for the CCE for the PDCCH. The UE monitors the PDCCH within the corresponding search space.

Figure 8:
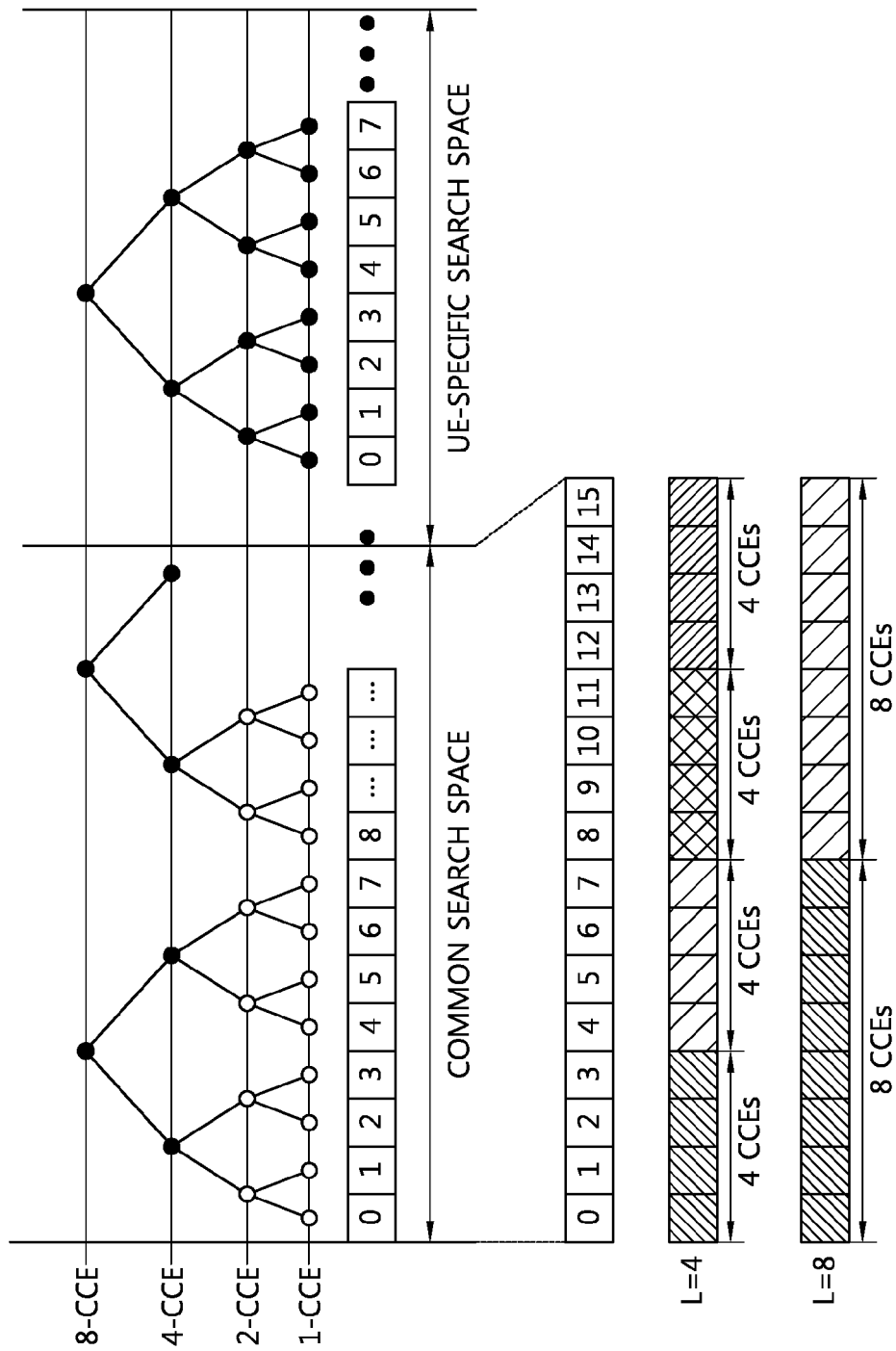
FIG. 8 is an exemplary diagram illustrating a common searching space and a terminal specific search space for monitoring the PDCCH.

FIG. 8 is an exemplary diagram illustrating a common searching space and a UE specific search space for monitoring the PDCCH.

The search space is divided into a common search space (CSS) and a UE-specific search space (USS). The common search space as a space for searching the PDCCH having common control information (may be called cell-specific control information) may be constituted by 16 CCEs of CCE indexes 0 to 15, and supports a PDCCH having CCE aggregation levels of 4 and 8. However, a PDCCH (DCI formats 1 and 1A) that transports UE-specific information may be transported to even the common search space. The UE-specific search space supports a PDCCH having CCE aggregation levels of 1, 2, 4, and 8.

Hereinafter, a signal transporting method in the multi-node system will be described. Hereinafter, an example to which the preset invention is applied will be primarily described in the multi-node system, but the present invention is not limited thereto. That is, the present invention may be applied to not the multi-node system but even a predetermined wireless communication system.

In the multi-node system, a base station having high transportation power and a plurality of nodes having low transportation power may be disposed. A new signal transporting method is required to support more UEs through limited radio resources. In particular, a problem is by what method a control signal is transported to the UE by allocating the control region.

1. Enhanced(E)—Control Region

Figure 9:
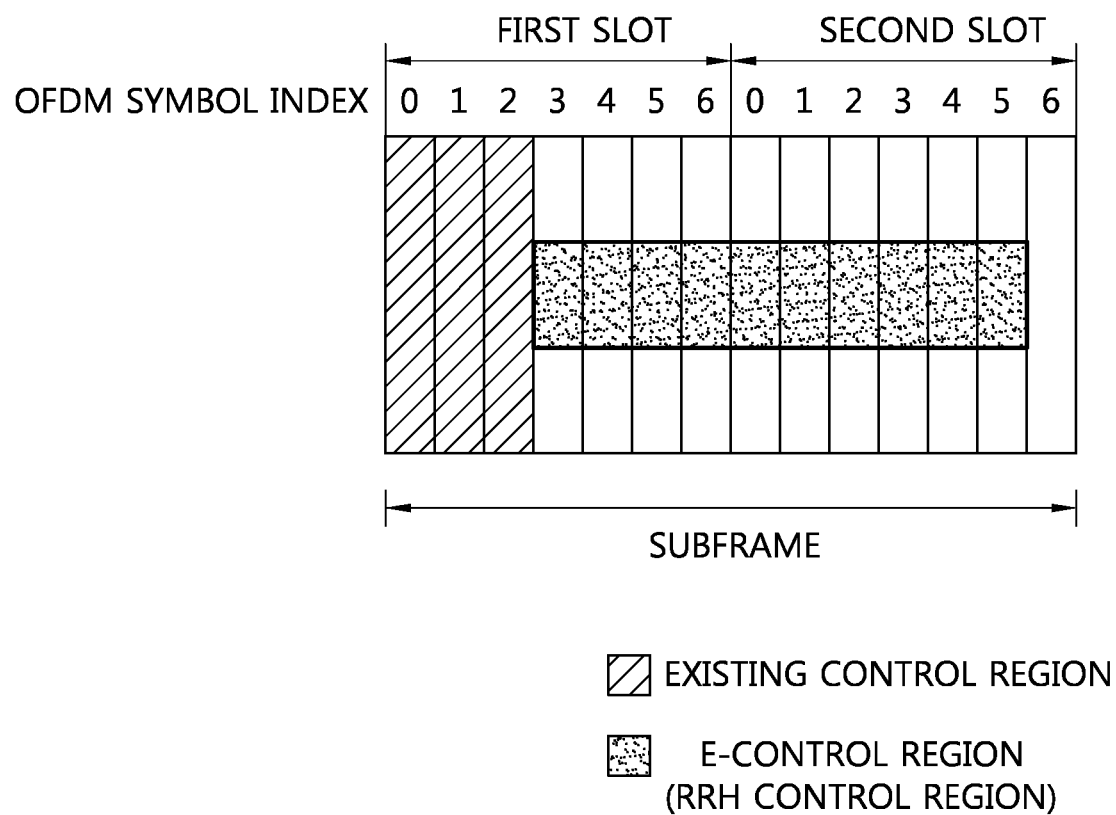
FIG. 9 illustrates an E-control region added according to an exemplary embodiment of the present invention.

FIG. 9 illustrates an E-control region added according to an exemplary embodiment of the present invention.

Referring to FIG. 9, the E-control region may be positioned subsequent to the existing control region in terms of the time region. For example, when the existing control region is transported in first three OFDM symbols of the subframe, the E-control region may be added to OFDM symbols positioned subsequent to the three OFDM symbols. In terms of the frequency region, the existing control region and the E-control region may coincide with each other or configured differently from each other. An example in which the E-control region is configured in only a partial frequency band of the existing control region is illustrated in FIG. 9.

Herein, the E-control region may mean a radio resource region to transport different control information for each node of the multi-node system. In this meaning, the E-control region may be called an 'RRH control region'.

In the E-control region, a signal for an advanced UE may be transported. The advanced UE means a UE that is capable of transporting and receiving the signal. The existing UE means a UE that operates according to a current communication standard. In other words, the existing UE a first-type UE that operates by a first radio access technology (RAT), for example, 3GPP LTE Rel-10 and the advanced UE may be a second-type UE that operates by a second RAT, for example, 3GPP LTE Rel-11. Herein, the second RAT may be an advance of the first RAT.

In the E-control region, for example, a control channel for the advanced UE may be transported. The control channel for the advanced UE is called an E-control channel so as to be distinguished from a control channel for the existing UE. The E-control channel includes an E-PDCCH, an E-PCFICH, an E-PHICH, and the like. Hereinafter, the PDCCH, the PCFICH, and the PHICH mean the existing control channels and the E-PDCCH, the E-PCFICH, the E-PHICH, and the like mean the E-control channels according to the present invention. Further, an X region means a radio resource region to which an X channel is transported in terms of the base station or the node and a radio resource region which receives the X channel in terms of the UE. For example, the E-PDCCH region means a radio resource region to which the E-PDCCH is transported.

Further, in the E-control region, a reference signal not used by the existing UE may be used. The advanced UE may receive a signal by using the reference signal not used by the existing UE in the E-control region.

The E-control region may be configured similarly as the R-PDCCH region used for the base station to transport the control information to a relay station. The R-PDCCH region may be configured for each slot as shown in a table below.

TABLE 3

| Configuration | 'DL-StartSymbol' | End symbol index |
|---|---|---|
| 0 | 1 | 6 |
| 1 | 2 | 6 |
| 2 | 3 | 6 |

TABLE 4

| Configuration | Start symbol index | End symbol index |
|---|---|---|
| 0 | 0 | 6 |
| 1 | 0 | 5 |

Table 3 shows an R-PDCCH configuration for a first slot and Table 4 shows an R-PDCCH configuration for a second slot. The base station gives a 'DL-StartSymbol' parameter of Table 3 above through a higher layer signal. When the base station and the relay station transport downlink subframe time-aligned around the subframe, Configuration 1 of Table 4 is used and if not, Configuration 0 of Table 4 is used. That is, the R-PDCCH indicates an OFDM symbol of a first slot indicated by the 'DL-StartSymbol' parameter and OFDM symbol #6 or #5 of a second slot. The E-control region may be configured similarly as the R-PDCCH region. For example, when the relay station is not present in the multi-node system, the same resource region as the R-PDCCH region may be set as the E-control region.

The E-control region and the R-PDCCH region are different from each other in terms of purposes thereof and transported control channels. That is, there is a difference in that the R-PDCCH region is used for the base station to transport the control information to the relay station and the E-control region is used for the base station or node to transport the control information to the UE. The control information transported in the E-control region is information to be ultimately received by the UE and may include cell-specific control information (for example, system information), UE-specific control information, and node-specific control information.

In terms of the control channel, there is a difference in that only the -PDCCH is transported in the R-PDCCH region, while the E-PDCCH, the E-PCIFICH, and the E-PHICH may be transported in the E-control region.

2. Presence or Absence of E-Control Region, Location Information, Size Information Signaling 1) The base station may transport 1. presence or absence of the E-control region, 2. location information of the E-control region, 3. size information of the E-control region in terms of the time, and 4. size information of the E-control region in terms of the frequency through higher layer information, the existing physical channels (for example, the PBCH, the PDCCH, and the PDCCH), or the E-PCFICH. Herein, the number of OFDM symbols or the number of slots may be given as the size information in terms of the time and the number of resource blocks or the number of subcarriers may be given as the size information in the frequency region. The location information of the E-control region may be regarded as scheduling information. That is, the UE may know a reference time and a reference frequency at which the E-control region is transported by the location information of the E-control region. For example, the UE may know in what subframe the E-control region by the location information of the E-control region and know a start frequency in the E-control region.

The information 1 to 4 may be individually encoded and transported or two or more information is joined and thereafter, is encoded into one information to be transported (that is, may be joint-encoded and transported). In this case, a predetermined table may be used between the base station and the UE.

The following table shows one example of E-PDCCH configuration information that may be used when some of the four information is joint-encoded and transported.

TABLE 5

| E-PDCCH configuration information | Number of resource blocks | E-PDCCH position |
|---|---|---|
| 0 | 0 | Not available (N/A) |
| 1 | 1 | One RB at the center frequency |
| 2 | 1 | One RB at the lowest frequency |
| 3 | 2 | Two RBs at the center frequency) |
| 4 | 2 | Two RBs at the lowest frequency and the highest frequency |

Table 5 shows that when the E-PDCCH configuration information is '0', the E-PDCCH is not present. In addition, Table 5 shows two information such as when the E-PDCCH configuration information is '1', the E-PDCCH is present and the size of the E-PDCCH in the frequency region is one resource block positioned at a center frequency of a configuration band. Table 5 shows two information such as when the E-PDCCH configuration information is '2', the E-PDCCH is present and the size of the E-PDCCH in the frequency region is one resource block positioned at the lowest frequency in the configuration band. Table 5 shows two information such as when the E-PDCCH configuration information is '3', the E-PDCCH is present and the size of the E-PDCCH in the frequency region is two resource blocks positioned at the center frequency of the configuration band. Table 5 shows two information such as when the E-PDCCH configuration information is '4', the E-PDCCH is present and the size of the E-PDCCH in the frequency region is two resource blocks at the lowest frequency and the highest frequency in the configuration band. Of course, Table 5 is just one example.

2) The base station (or node) may notify the presence or absence and/or allocation location of the E-control region through a CFI value transported through the existing PCFICH to the UE.

The following table shows a CFI index and a CFI codeword that are regulated in a current standard.

TABLE 6

| CFI | CFI codeword <b0, b1, . . . , b31> |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

As shown in Table 6 above, CFI index 4 is a reserved index. By using the reserved CFI index, whether the E-control region is present in the corresponding subframe or the configuration of the E-control region may be indicated. The configuration of the E-control region means the size and position of the E-control region.

For example, when the CFI index is 4, the number of OFDM symbols in the PDCCH region may be 3 and the E-control region may be present. When the UE receives CFI index 4 through the PCFICH, the E-control region may be present. Further, the PDCCH may be present in 3 OFDM symbols of the subframe and the E-control region may be positioned in range of the 3 OFDM symbols to a last OFDM symbol or a last second OFDM symbol of the subframe. Herein, the number of OFDM symbols of the PDCCH is 3 is just one example.

When the CFI index is 4, the existing UEs do not recognize that the CFI index is 4 to cause an operational error. Therefore, CFI index 4 may be limited to be used in only the resource region not used by the existing UE, for example, a subcarrier which the existing UE cannot approach.

3. E-Physical Control Format Indication Channel (E-PCFICH)

The E-control region may be dynamically changed unlike the R-PDCCH region. Since the R-PDCCH region used to transport the control information to relay stations of a fixed number, the size is not dynamically changed. On the contrary, since the E-control region is used to transport control information on UEs that are present within a coverage of a node and the number of UEs that are present within the coverage of the node may be changed, the size may be dynamically changed. Therefore, information indicating the size of the E-control region is required.

The UE may need the location information and the size information of the E-control region in order to recognize the E-control region. For example, the subframe and the reference frequency band in which the E-control region is transported may be known through the location information of the E-control region. In addition, the size (that is, what number of OFDM symbols the E-control region is constituted by) of the E-control region in terms of the time of the E-control region may be known through the size information of the E-control region and the size (that is, what resource blocks the E-control region is constituted by) of the E-control region in terms of the frequency may be known. Hereinafter, a channel that transports the size information of the E-control region will be referred to as the E-PCFICH.

The E-PCFICH may be defined so as not to overlap with the region where the existing PCFICH is transmitted. That is, the E-PCFICH may be regulated to be transmitted in an OFDM symbol other than the first OFDM symbol of the subframe.

The E-PCFICH region in which the E-PCFICH is transported may be independently positioned in the E-control region. Alternatively, the E-PCFICH may be included in the E-control region or subordinately positioned in the E-control region.

Figure 10:
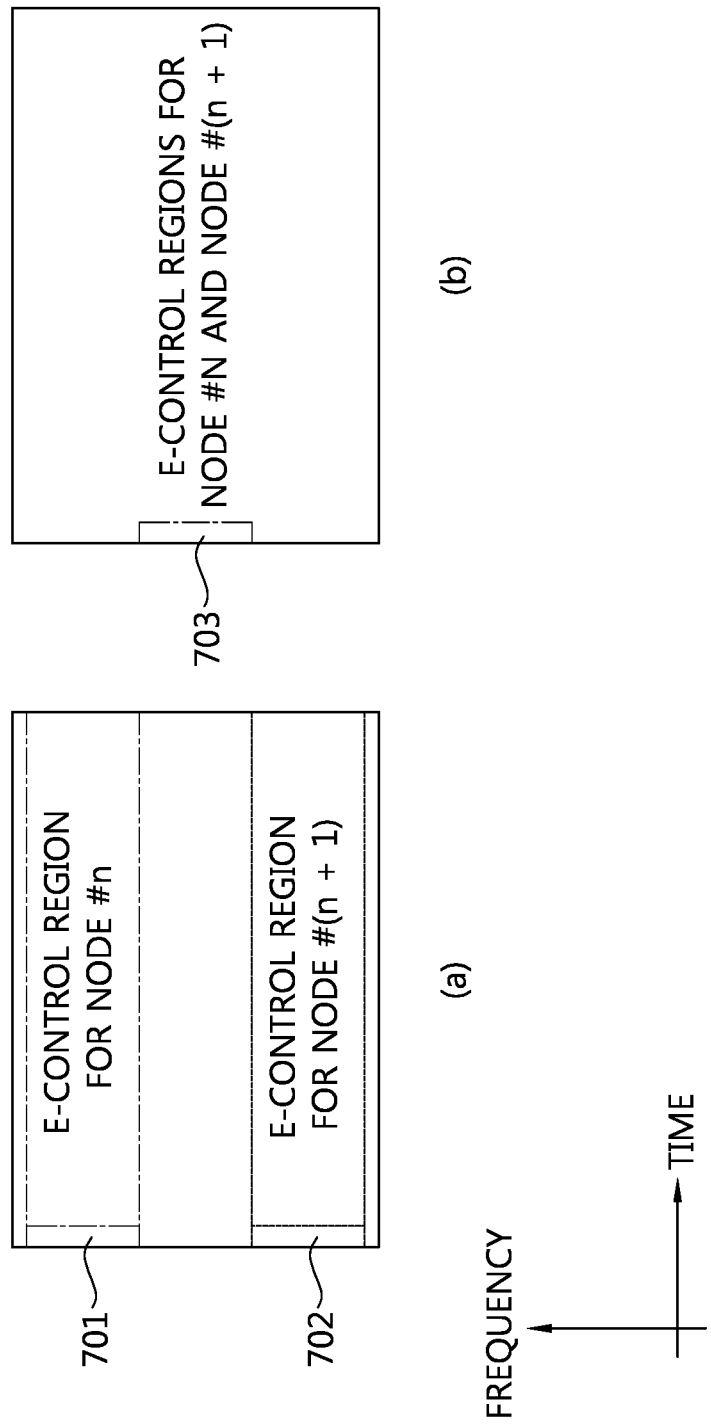
FIG. 10 illustrates an example in which an E-PCFICH region is allocated.

FIG. 10 illustrates an example in which an E-PCFICH region is allocated.

Referring to FIG. 10(a), E-PCFICH regions 701 and 702 corresponding to the E-control region each node are allocated. That is, the E-PCFICH 701 corresponding to the E-control region for node #n and the E-PCFICH 702 corresponding to the E-control region for node #(n+1) are respectively allocated.

Referring to FIG. 10(b), the E-control region for each node is not present and a common radio resource region may be provided, unlike FIG. 10(a). In this case, size information of the common radio resource region may be provided to the UE with respect to the E-control region for a plurality of nodes.

The method of FIG. 10(a) has relatively large signaling overhead than the method of FIG. 10(b), but has an advantage of flexibly changing the size of the E-PDCCH depending on a change in the number of UEs controlled for each node. The method of FIG. 10(b) has an advantage and a disadvantage opposite to the method of FIG. 10(a).

The E-PCFICH regions 701, 702, and 703 are present in the E-control region in FIG. 10, but the present invention is not limited thereto and the E-PCFICH regions may be present outside the E-control region.

Hereinafter, it will be described what resource region the control channels may be transported through. As described above, the control channels in the E-control region includes the E-PHICH, the E-PDCCH, the E-PCFICH, and the like and the control channels will be referred to as an E-control channel for convenience.

First, the region in which the E-control channels are transported may be determined to be static for each node. The UE may receive an index of a node, a cell ID, the total number of nodes in the cell, a system band (the number of resource blocks), and the like from the base station. Herein, the index of the node may be a reference signal index distinguished fro each node. The reference signal index may include a reference signal port number, a reference signal configuration number, and a reference signal subframe configuration number. The information may be transported with being included in the system information transported by the base station, included in the higher layer information, or included in a synchronization signal.

The region in which the E-control channel is transported may be regulated by some or all functions of the cell ID, the node index, the total number of nodes in the cell, and the system band (the number of resource blocks). Then, the base station just transport the information including the cell ID, the node index, and the like and thereafter, transport the E-control channel through the radio resource region determined according to the functions without additional signaling that notifies the region in which the E-control channel is transported to the UE. The UE may know the region in which the E-control channel is transported through the information including the cell ID, the node index, and like.

Alternatively, the region in which the E-control channels are transported may be determined to be semi-static. For example, the E-PCFICH may be present at a predetermined location and the location information of the E-PDCCH may be transported with being included in a higher layer signal.

Figure 11:
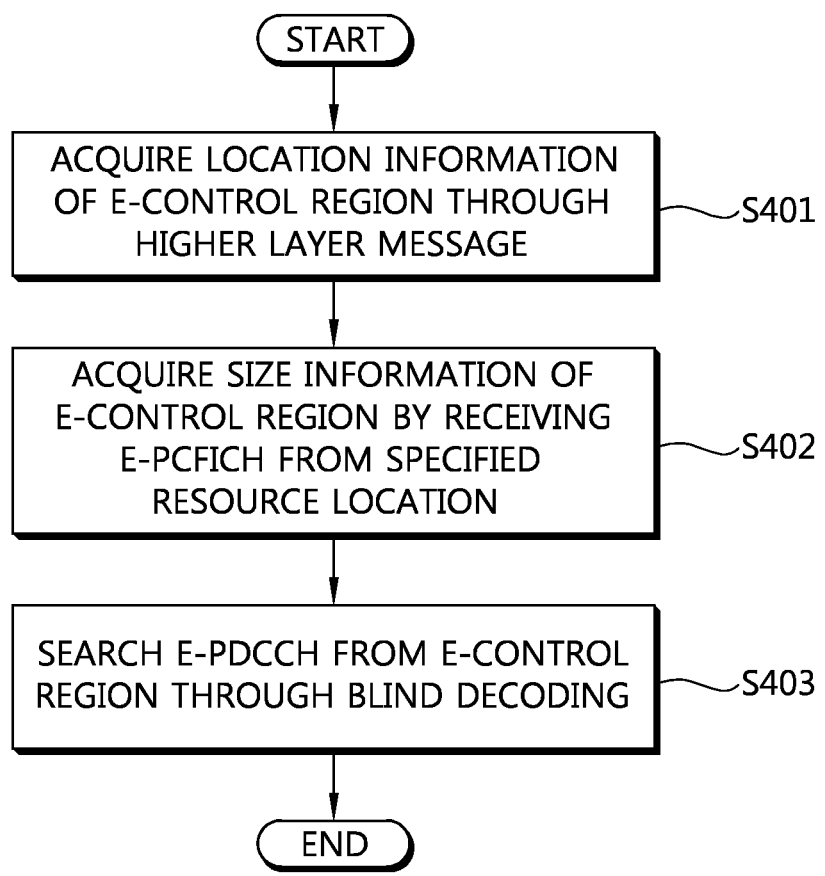
FIG. 11 illustrates one example of an operating method of a terminal when a region to which E-control channels are transported is semistatically determined.

FIG. 11 illustrates one example of an operating method of a UE when a region to which E-control channels are transported is semistatically determined.

Referring to FIG. 11, the UE acquires the location information of the E-control region through a higher layer message. The higher layer message may be, for example, an RRC message transported by the base station and the location information of the E-control region may be included in the RRC message. The RRC message may be included in a system information block (SIB) transported within the PDSCH or included in a master information block (MIB) transported in the PBCH. Alternatively, the location information of the E-control region may be transported with being included in an RRC information element (IE) in addition to the SIB or MIB. The location information of the E-control region may be added to the existing RRC message or transported through an RRC message that is newly defined for the advanced UE.

The UE receives the E-PCFICH at a regulated resource location to acquire the size information of the E-control region (S402).

The UE searches the E-PDCCH through the blind decoding in the E-control region (S403).

Alternatively, the region in which the E-control channels are transported may be dynamically determined. That is, the base station may add the presence or absence and/or location information of the E-control channel to the DCI transported through the existing PDCCH and transport them. Then, the UE may acquire the presence or absence and location information of the E-control channel through the existing PDCCH. The E-PCFICH and the E-PDCCH may be regulated to be positioned in the same resource block and in this case, the UE may receive a resource block start location of the E-PCFICH or E-PDCCH through the existing PDCCH.

Figure 12:
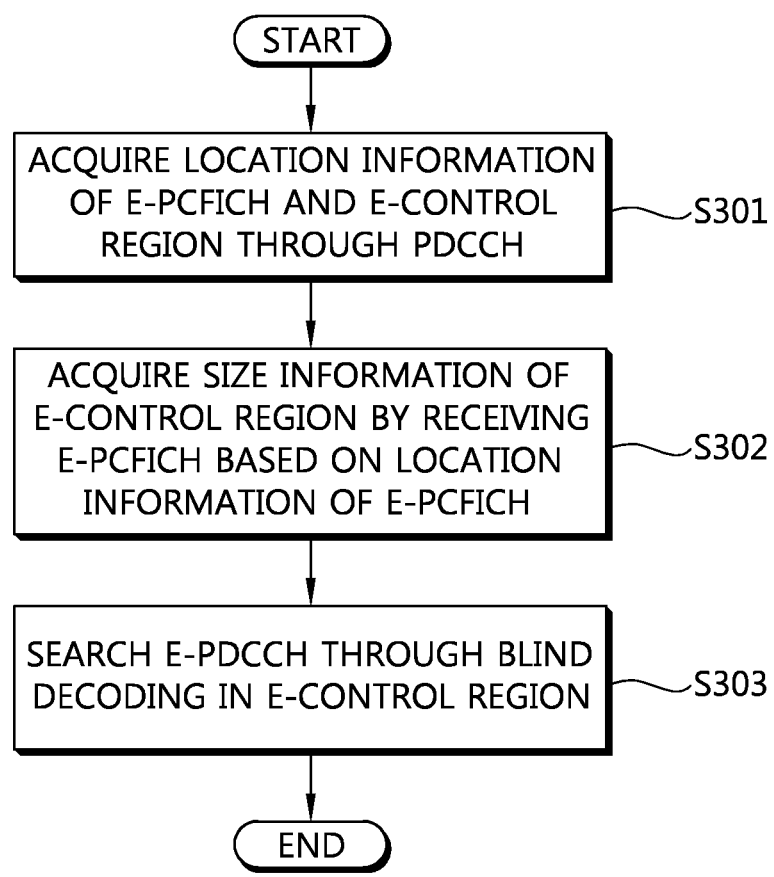
FIG. 12 illustrates one example of the operating method of the terminal when the region to which E-control channels are transported is dynamically determined.

FIG. 12 illustrates one example of the operating method of the UE when the region to which E-control channels are transported is dynamically determined.

Referring to FIG. 12, the UE acquires location information of the E-PCFICH and the E-control region through the existing PDCCH (S301). For example, the location information of the E-PCFICH may be added to the DCI transported through the existing PDCCH.

The UE receives the E-PCFICH based on the location information of the E-PCFICH to acquire the size information of the E-control region (S302). As the size information of the E-control region, the number of OFDM symbols may be given in terms of the time and the number of resource blocks or the number of subcarriers may be given in terms of the frequency.

The UE searches the E-PDCCH through the blind decoding in the E-control region (S303).

When a plurality of E-PCFICHs and E-control regions are present with respect to the plurality of nodes, the operations described in FIGS. 11 and 12 may be defined with respect to the E-PCFICH and E-control region for a specific node. Therefore, the base station may additionally provide, to the UE, information indicating which E-control region of the plurality of E-control regions the UE receives the control information in.

Figure 13:
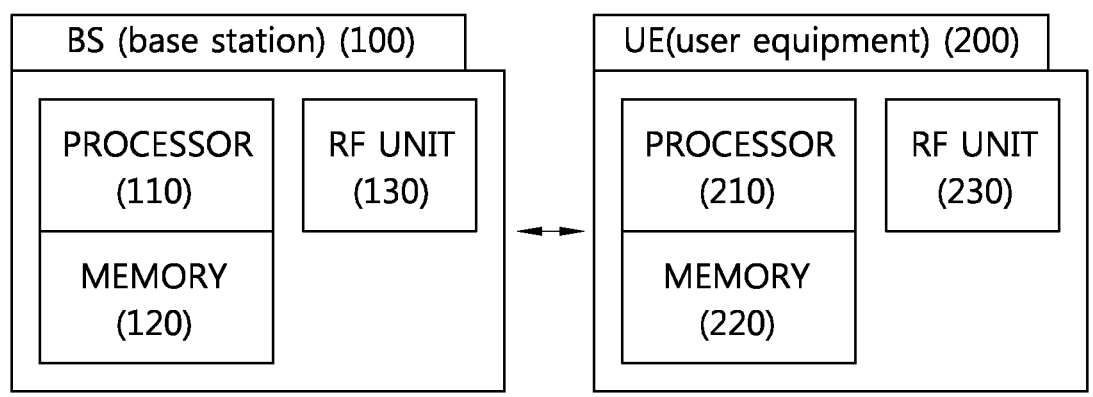
FIG. 13 is a block diagram illustrating a base station and a terminal.

FIG. 13 is a block diagram illustrating a base station and a UE.

A base station 100 includes a processor 110, a memory 120, and a radio frequency (RF) unit 130. The processor 110 implements a function, a process, and/or a method which are proposed. For example, the processor 110 may transport, to the UE, the presence or absence of the E-control region, the location information of the E-control region, the size information of the E-control region in terms of the time, and the size information of the E-control region in terms of the frequency through the existing physical channel or R-PCFICH as the higher layer message such as the RRC message or the physical layer signal such as the DCI or CFI. The memory 120 is connected with the processor 110 to store various information for driving the processor 110. The RF unit 130 is connected with the processor 110 to transport and/or receive a radio signal.

A UE 200 includes a processor 210, a memory 220, and an RF unit 230. The processor 210 implements a function, a process, and/or a method which are proposed. For example, the processor 210 receives the presence or absence of the E-control region transported by the base station, the location information of the E-control region, the size information of the E-control region in terms of the time, and the size information of the E-control region in terms of the frequency through the existing physical channel or E-PCFICH. In addition, the processor 210 searches the E-PDCCH within the E-control region. The memory 220 is connected with the processor 210 to store various information for driving the processor 210. The RF unit 230 is connected with the processor 210 to transport and/or receive the radio signal.

The processors 110 and 210 may include an application-specific integrated circuit (ASIC), another chipset, a logic circuit, a data processing device and/or a converter converting a baseband signal and a radio signal into each other. The memories 120 and 220 may include a read-only memory (ROM), a random access memory (RAM), a flash memory, a memory card, a storage medium, and/or another storage device. The RF units 130 and 230 may include one or more antennas that transport and/or receive the radio signal. When an embodiment is implemented by software, the aforementioned technique may be implemented by a module (a process, a function, and the like) that performs the aforementioned function. The module may be stored in the memories 120 and 220 and executed by the processors 110 and 210. The memories 120 and 220 may be provided inside or outside the processors 110 and 210 and connected with the processors 110 and 210 by various well-known means.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed as limiting the technical spirit of the present invention, but should be construed as illustrating the technical spirit of the present invention. The scope of the technical spirit of the present invention is not restricted by the embodiments, and the scope of the present invention should be interpreted based on the following appended claims.

What is claimed is:

1. A method for searching control information by a terminal, the method comprising:

acquiring, by the terminal from a base station, location information of an evolved-physical control formation indication channel (E-PCFICH) or location information of an evolved-control (E-control) region, wherein the location information of the E-PCFICH or E-control region is acquired by a physical downlink control channel (PDCCH) or a higher layer message;

receiving, by the terminal, the E-PCFICH based on the location information of the E-PCFICH;

acquiring, by the terminal, size information of the E-control region based on the E-PCFICH; and searching, by the terminal, an evolved-physical downlink control channel (E-PDCCH) in the E-control region, wherein the PDCCH is a control channel through which the base station transports control information and is transported in first N (N is one of natural numbers of 1 to 4) orthogonal frequency division multiplexing (OFDM) symbols, wherein the E-PDCCH is a control channel through which the base station transports the control information and is positioned in at least one OFDM symbol positioned subsequent to the PDCCH, wherein the E-control region is a radio resource region including at least one of the E-PDCCH and the E-PCFICH, the E-PCFICH is received based on the location information, the location information received through the PDCCH is used to acquire the size information of the E-control region, and the E-control region is determined based on the location information of the E-control region and the size information of the E-control region, wherein the size information of the E-control region indicates a size of the E-control region in a time domain and a frequency domain, wherein the location information of the E-control region and the size information of the E-control region are joint-encoded, wherein the location information of the E-PCFICH and the location information of the E-control region are associated with node information received from the base station, wherein the node information includes at least one of a node index, a reference signal port number, a reference signal configuration number, and a reference signal subframe configuration number, wherein the E-control region is a remote radio head (RRH) control region, and wherein the E-PCFICH is positioned outside a resource region in which a first OFDM symbol of a subframe transporting a physical control formation indication channel (PCFICH) to acquire the size information of the PDCCH is allocated.

2. The method of claim 1, wherein:
an E-PCFICH region in which the E-PCFICH is transported and an E-PDCCH region in which the E-PDCCH is transported are positioned at the same resource block.

3. The method of claim 1, wherein:
the location information of the E-PCFICH and the location information of the E-control region are included in downlink control information (DCI) transported through the PDCCH or the higher layer message.

4. A terminal, comprising:
a radio frequency (RF) transceiver configured to transmit and receive a radio signal; and
a processor configured to:
acquire, from a base station, location information of an evolved-physical control formation indication channel (E-PCFICH) or location information of an evolved-control (E-control) region, wherein the location information of the E-PCFICH or E-control region is acquired by a physical downlink control channel (PDCCH) or a higher layer message,
receive the E-PCFICH based on the location information of the E-PCFICH,
acquire size information of the E-control region based on the E-PCFICH, and
search an evolved-physical downlink control channel (E-PDCCH) in the E-control region, wherein the PDCCH is a control channel through which the base station transports control information and is transported in first N (N is one of natural numbers of 1 to 4) orthogonal frequency division multiplexing (OFDM) symbols, wherein the E-PDCCH is a control channel through which the base station transports the control information and is positioned in at least one OFDM symbol positioned subsequent to the PDCCH, wherein the E-control region is a radio resource region including at least one of the E-PDCCH and the E-PCFICH, the E-PCFICH is received based on the location information, the location information received through the PDCCH is used to acquire the size information of the E-control region, and the E-control region is determined based on the location information of the E-control region and the size information of the E-control region, wherein the size information of the E-control region indicates a size of the E-control region in a time domain and a frequency domain, wherein the location information of the E-control region and the size information of the E-control region are joint-encoded, wherein the location information of the E-PCFICH and the location information of the E-control region are associated with node information received from the base station, wherein the node information includes at least one of a node index, a reference signal port number, a reference signal configuration number, and a reference signal subframe configuration number, wherein the E-control region is a remote radio head (RRH) control region, and wherein the E-PCFICH is positioned outside a resource region in which a first OFDM symbol of a subframe transporting a physical control formation indication channel (PCFICH) to acquire the size information of the PDCCH is allocated.

5. The terminal of claim 4, wherein an E-PCFICH region in which the E-PCFICH is transported and an E-PDCCH region in which the E-PDCCH is transported are positioned at the same resource block.

6. The terminal of claim 4, wherein the location information of the E-PCFICH and the location information of the E-control region are included in downlink control information (DCI) transported through the PDCCH or the higher layer message.

* * * * *